United States Patent
Storer

(10) Patent No.: US 6,231,093 B1
(45) Date of Patent: May 15, 2001

(54) PUSH BAR MOUNTING SYSTEM

(76) Inventor: Ron D. Storer, 18111 Stratford La., Villa Park, CA (US) 92861

(*) Notice: Subject to any disclaimer, the term of this patent is extended or adjusted under 35 U.S.C. 154(b) by 0 days.

(21) Appl. No.: 09/241,587

(22) Filed: Feb. 2, 1999

(51) Int. Cl.$^7$ .................................................. B60R 19/26
(52) U.S. Cl. .......................... 293/115; 293/143; 293/155
(58) Field of Search ................................... 296/115, 143, 296/142, 144, 146, 148, 147, 155

(56) References Cited

U.S. PATENT DOCUMENTS

| | | |
|---|---|---|
| 1,037,122 | 8/1912 | Buffinger . |
| 1,306,363 * | 6/1919 | Warman ................................ 293/115 |
| 1,688,950 | 12/1928 | Wait . |
| 1,911,413 | 5/1933 | Wait . |
| 2,525,964 * | 10/1950 | Slaback ............................ 293/143 X |
| 2,649,308 | 8/1953 | Bice, Jr. .................................... 280/5 |
| 2,687,912 * | 8/1954 | Beauchamp ......................... 293/115 |
| 2,844,864 | 7/1958 | Schilberg ................................. 29/155 |
| 2,954,256 * | 9/1960 | Barenyi ............................ 293/143 X |
| 3,431,005 * | 3/1969 | Priefert ................................. 293/115 |
| 3,438,667 * | 4/1969 | Davis .................................... 293/115 |
| 3,470,598 | 10/1969 | Helsen .................................... 29/155 |
| 3,610,609 * | 10/1971 | Sobel ............................... 293/143 X |
| 3,774,952 | 11/1973 | Zorn .................................... 293/69 R |
| 4,168,855 * | 9/1979 | Koch ................................. 293/143 X |
| 4,274,648 | 6/1981 | Robins .................................. 280/166 |
| 4,753,447 | 6/1988 | Hall ....................................... 270/163 |
| 4,825,975 | 5/1989 | Symes ..................................... 182/92 |
| 4,964,256 | 10/1990 | McCracken ............................ 52/726 |
| 5,067,760 | 11/1991 | Moore et al. ......................... 293/115 |
| 5,139,295 | 8/1992 | Escobedo ............................. 293/117 |
| 5,215,343 * | 6/1993 | Fortune ............................ 293/115 X |
| 5,277,465 * | 1/1994 | Weir ................................. 293/143 X |
| 5,683,128 * | 11/1997 | Heyns .................................... 293/115 |
| 5,695,228 | 12/1997 | Storer ..................................... 293/115 |
| 6,022,057 * | 2/2000 | Vermeulen ...................... 293/143 X |

FOREIGN PATENT DOCUMENTS

| | | |
|---|---|---|
| 1452956 | 6/1969 | (EP) . |
| 1524296 | 3/1967 | (FR) . |
| 323468 | 12/1929 | (GB) . |

OTHER PUBLICATIONS

Go Rhino! Products, Catalog 960.

* cited by examiner

Primary Examiner—Joseph D. Pape
(74) Attorney, Agent, or Firm—Stetina Brunda Garred & Brucker

(57) ABSTRACT

A push bar mounting system for mounting a push bar to vehicle's bumper without significant damage to the bumper. The system comprises a front and rear bracket mounted to an inner bumper of the vehicle and having top and bottom mounting tabs that extend away from the inner bumper. The brackets are configured to attach to the inner bumper without drilling mounting holes therein. Additionally, the mounting tabs are configured to extend through a bumper fascia that surrounds the inner bumper. As such, the bottom mounting tab extends through a grille opening in the fascia, and the upper mounting tab extends through a small horizontal opening cut out of the bumper fascia's chrome trim channel. Upon removal of the push bar from the vehicle, the opening cut in the bumper fascia can be covered by replacing the chrome trim that is mounted in the trim channel.

7 Claims, 4 Drawing Sheets

PUSH BAR MOUNTING SYSTEM

FIELD OF THE INVENTION

The present invention generally relates to push bars for vehicles and more specifically to a mounting system for such a device that does not significantly damage the bumper of the vehicle to which the push bar is mounted.

BACKGROUND OF THE INVENTION

Push bars are mounted on law enforcement vehicles to protect the front of the vehicle while pushing stranded vehicles off the roadway. Such devices are well known and are commonly mounted to the front bumper of such vehicles. The push bar usually comprises a generally vertical member mounted to the bumper of the vehicle. The vertical member is typically fabricated from a metallic material with the necessary strength to support the resistance of another vehicle during pushing. Typically, the vertical member will have a rubber coating or bumper applied to the surface that contacts the stranded vehicle. Usually, two push bars are mounted on either side of the vehicle's front grille in order to properly push a stranded vehicle.

In order to further protect the front of the law enforcement vehicle, the two vertical members can be interconnected by two generally horizontal members disposed in front the vehicle's grille and configured to form a grille guard. Additionally, the push bar may comprise two generally horizontal tubular members that wrap around the front ends of the vehicle to form a wrap around brush guard that adds further protection thereto. As will be recognized to those of ordinary skill in the art, the push bar/grille guard is not limited to just law enforcement vehicles but may be mounted to any vehicle for protection thereof. As such, the push bar/grill guard may be mounted on off-road vehicles or tow trucks.

The push bar is essential for proper law enforcement activities. It allows the law enforcement official to use his/her vehicle to push stranded or damaged vehicles during emergency situations. The push bar ensures that the grille and bumper of the law enforcement vehicle will not be damaged during such maneuvers.

The typical law enforcement vehicle is specially outfitted with police accessories such as emergency lights, police computer, heavy duty engine and suspension. The bumper unit of a typical vehicle is formed from two members and is used for mounting the push bar thereon. The first member is an outer, purely decorative fascia that integrates the styling of the vehicle to the bumper unit. The second member is an inner metallic bumper disposed within the fascia and attached to the frame of the vehicle. The inner bumper is configured to absorb impacts and therefore has the necessary strength and rigidity to mount the push bar thereon. The bumper fascia is secured to the front of the vehicle and over the inner bumper via plastic push fasteners.

The conventional push bar is typically mounted to the inner bumper and bumper fascia of the law enforcement vehicle. As such, mounting and/or access holes must be drilled into the bumper and the bumper fascia. Therefore, the conventional push bar is difficult to install because the holes in the bumper and bumper fascia must be perfectly positioned and aligned. Typically, installation takes about two hours and must be performed by a professional in order to insure proper installation.

Currently, law enforcement vehicles are replaced quite often due to the wear from constant use. Therefore, after having been used, the law enforcement vehicle is re-sold at auction to the public. However, the conventional mounting of push bars necessitates the replacement of the bumper and bumper fascia when the push bar is removed prior to re-sale. The mounting holes drilled in the bumper weaken the bumper such that it is not safe for use. Additionally, the holes created in the bumper fascia necessitate replacement thereof because such holes detract from the vehicle's appearance. Therefore, when a law enforcement vehicle is re-sold, typically the vehicle's bumper and bumper fascia are replaced. However, this is not desirable because it adds additional expense to the cost of the used law enforcement vehicle.

The present invention addresses the above-mentioned deficiencies in conventional push bar mounting methods by providing a mounting system that does not significantly damage the vehicle's bumper. Therefore, the present invention does not necessitate replacement of the vehicle's bumper or bumper fascia and provides a system for mounting a push bar that is quick and simple to install. Additionally, the present invention may be adapted for installation of push bars and other accessories to protect other types vehicles, not just law enforcement vehicles.

SUMMARY OF THE INVENTION

The present invention is a push bar mounting system for a vehicle bumper having a front and rear side. The system comprises a first, generally C-shaped front bracket formed complementary in shape to the bumper and having a first mounting tab. The first front bracket is generally disposed proximate to the front side of the bumper. Additionally, the system further comprises a first, generally planar rear bracket, formed complementary in shape to the rear side of the bumper, and having a second mounting tab. The first rear bracket is disposed proximate to the rear of the bumper and attached to the first front bracket. Furthermore, in accordance with the present invention, there is provided a first generally vertical push bar member mechanically attached to the first and second mounting tabs and disposed proximate to the front of the vehicle so as to prevent damage thereto during pushing maneuvers. The first and second mounting tabs are configured to project outwardly from exit openings in a bumper fascia that covers the bumper. As such, the first mounting tab exits the fascia through an opening removed from the bumper fascia and the second mounting tab exits through a grille opening of the fascia.

The push bar mounting system may further include a second generally vertical push bar member that is attached to a second front bracket via a third mounting tab and second rear bracket via a fourth mounting tab similar to the first push bar member. As such, the first and second vertical push bar members comprise a protective push bar system for the front of the vehicle.

The push bar mounting system constructed in accordance with the present invention may further include a first and second horizontal grille guard member. As such, the first and second horizontal grille guard members are attached to the first and second vertical push bar members to form a protective grille guard for the front of the vehicle.

The present invention further includes a method of mounting a push bar to a vehicle bumper having a fascia cover. The method comprises the step of first removing the fascia from the bumper. Next, a section of the fascia is removed to provide an opening therein. Front and rear brackets are attached to the bumper such that the bumper is disposed therebetween. Both brackets provide mounting tabs for attaching a generally vertical push bar thereto. Next, the bumper fascia is re-attached to the bumper such that one of the bracket mounting tabs projects through the opening formed therein and the other mounting tab projects through a grille opening of the fascia. Finally, a generally vertical push bar member is attached to the mounting tabs in order to protect the front of the vehicle from damage. It is contemplated in the present invention that a second vertical push bar member is attached to the bumper in a similar fashion as the first member. Additionally, the method of mounting the push bar to the vehicle may further comprise mounting a first and a second generally horizontal grille member between the push bar members in order to form a grille guard.

BRIEF DESCRIPTION OF THE DRAWINGS

These as well as other features of the present invention, will become more apparent upon reference to the drawings wherein.

DETAILED DESCRIPTION OF THE PREFERRED EMBODIMENT

Figure 1:
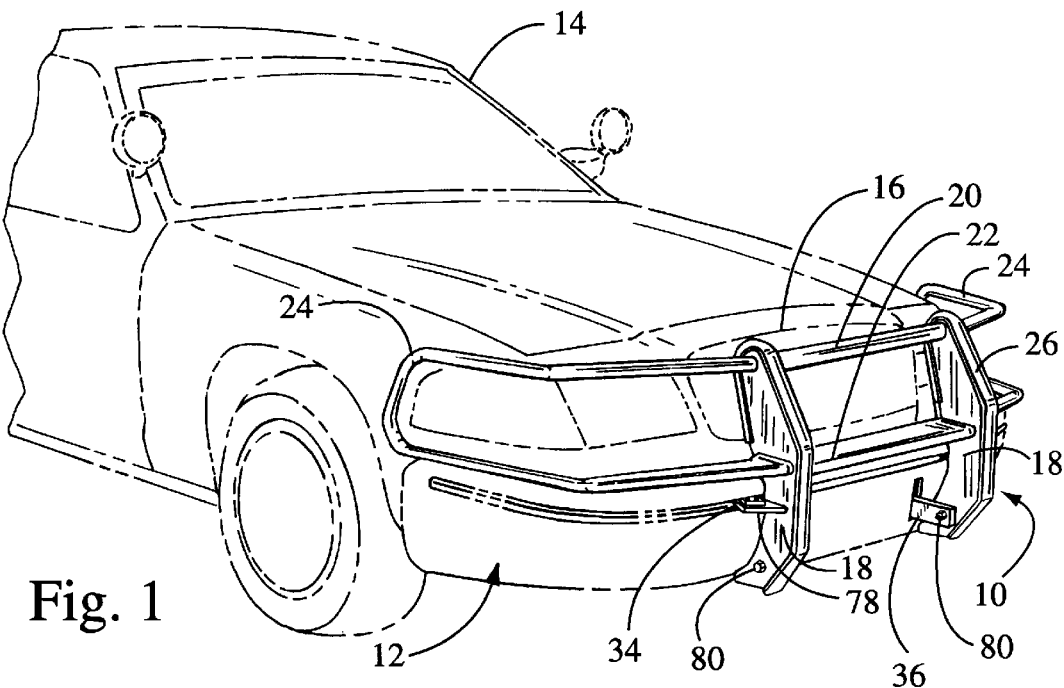
FIG. 1 is a perspective view of a push bar assembly, grille guard and wraparound brush guard mounted to a law enforcement vehicle.

Referring now to the drawings wherein the showings are for purposes of illustrating a preferred embodiment of the present invention only, and not for purposes of limiting the same, FIG. 1 perspectively illustrates a push bar assembly 10 mounted to the front of a law enforcement vehicle 14. The mounting system described herein can be adapted for any type of vehicle 14 that is used to push other vehicles. Presently, the typical law enforcement vehicle is a Ford Crown Victoria and the assembly 10 may be adapted for use on such vehicles.

The push bar assembly 10 protects the front of the law enforcement vehicle 14 from damage that may be caused by pushing another vehicle during emergencies or mechanical breakdowns. Typically, the law enforcement vehicle will use two push bar assemblies 10 mounted on both sides of a grille 16. As such, each push bar assembly 10 comprises at least one generally vertical push bar member 18 configured to extend generally proximate the grille and/or front lights of the vehicle 14. The push bar member 18 is configured to protect the front of vehicle 14 from damage and is therefore mounted in front of a decorative bumper fascia 12. The push bar member 18 extends in a generally vertical direction such that the law enforcement vehicle 14 may push vehicles with varying bumper heights without damage to either the law enforcement vehicle 14 or the vehicle being pushed.

In the preferred embodiment of the present invention, as seen in FIG. 1, two push bar assemblies 10 can be interconnected by a top horizontal grille guard member 20 and a bottom horizontal grille guard member 22 in order to protect the grille 16 of vehicle 14 from damage. The top grille guard member 20 is mechanically attached to the top end of each push bar member 18, while the bottom grille guard member 22 is attached near the middle of each push bar member 18. The grille guard members 20 and 22 are typically attached to each vertical push bar member 18 through the use of a threaded fastener in order to facilitate installation thereof or through a welded joint. The configuration of each of the vertical push bar members 18 and the top and bottom grille guard members 20, 22 protect the grille area of the vehicle 14 from damage. Additionally, the bottom and top grille guard members 20, 22 provide a location to install lights, winches, tow hooks and any other type of emergency equipment and the push bar member 18 and grille guard members 20, 22 may be pre-drilled for installation of such accessories. Furthermore, as will be recognized by those of ordinary skill in the art, the top and bottom horizontal grille guard members 20, 22 may extend around the front ends of the vehicle 14 to form a wraparound brush guard 24. As such, the grille guard members 20, 22 wrap around the front of the vehicle 14 and are configured to prevent damage to the lights of vehicle 14.

In accordance with the preferred embodiment of the present invention, each push bar member 18 may be formed from two generally planar sections of metallic material attached perpendicular to each other to form a generally T-shaped cross section. Therefore, as will be recognized, the two sections may be welded or attached to each other through conventional means. A rubber strip 26 may be applied to a vehicle contact surface of each push bar member 18. The strip 26 may be attached through the use of an adhesive or slid over the T-shaped cross section as is commonly known. The rubber strip 26 prevents damage to the vehicle being pushed by the law enforcement vehicle 14. Additionally, in order to protect the push bar assembly 10 from harsh environmental conditions, all of the parts are fabricated with a rugged, black, powder coat finish.

Figure 6:
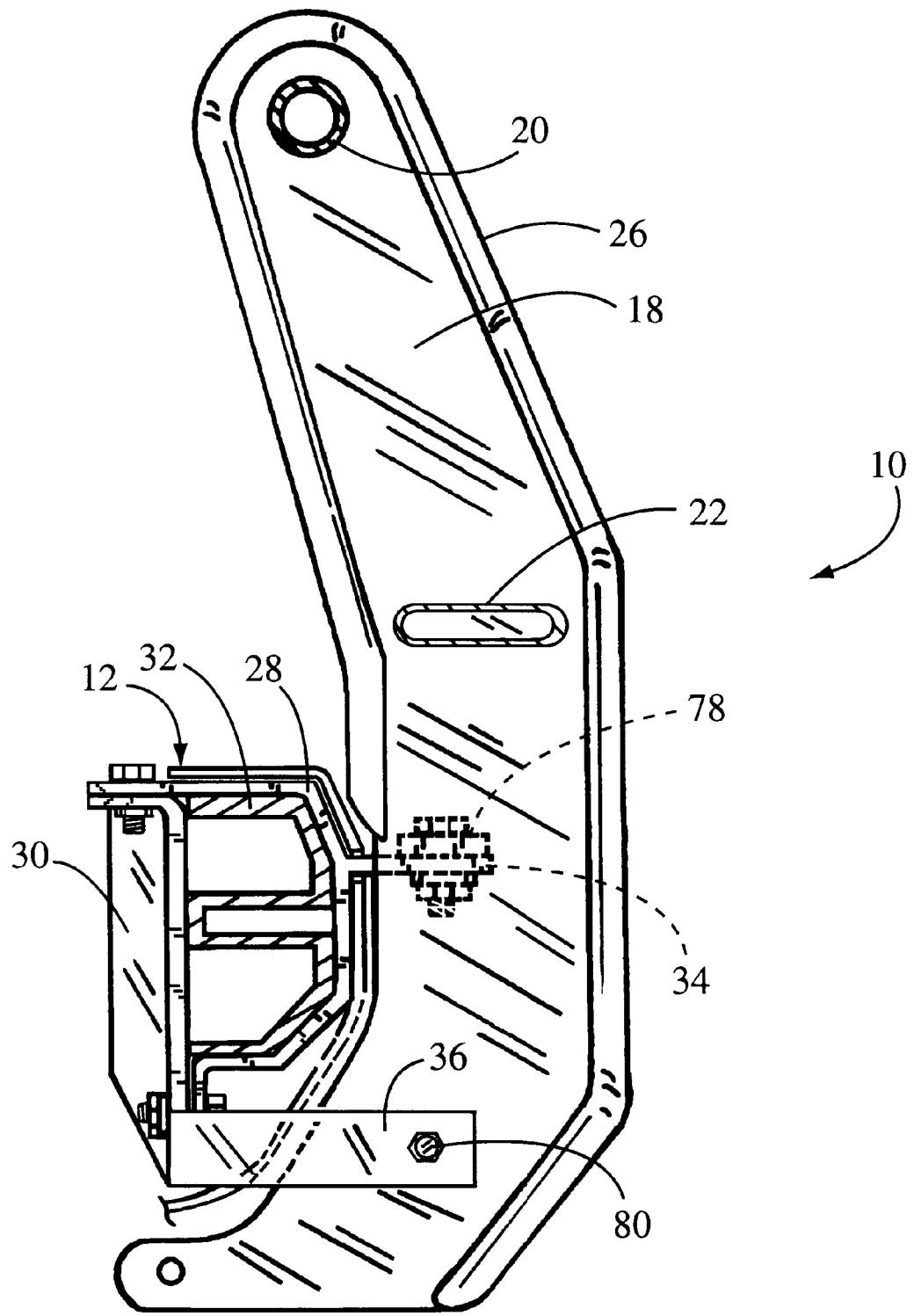
FIG. 6 is a side plan view of the push bar assembly.

Referring now to FIG. 6, the push bar assembly 10 comprises a front bracket 28 and a rear bracket 30 and the push bar member 18 mounted thereto. The front bracket 28 and the rear bracket 30 are attached to each other such that the brackets 28, 30 compress an inner metallic bumper 32 disposed behind the bumper fascia 12. The front bracket 28 is provided with a top mounting tab 34 for attachment of the push bar member 18 and similarly the rear bracket 30 is provided with a bottom mounting tab 36 for attachment of push bar member 18. The inner bumper 32 is attached to the vehicle 14 in a conventional fashion and protects the front of vehicle 14 from damage. The bumper fascia 12 surrounds the inner bumper 32 with enough space therebetween such that the front and rear brackets 28, 30 may be attached to the inner bumper 32 without deforming the bumper fascia 12.

Figure 5:
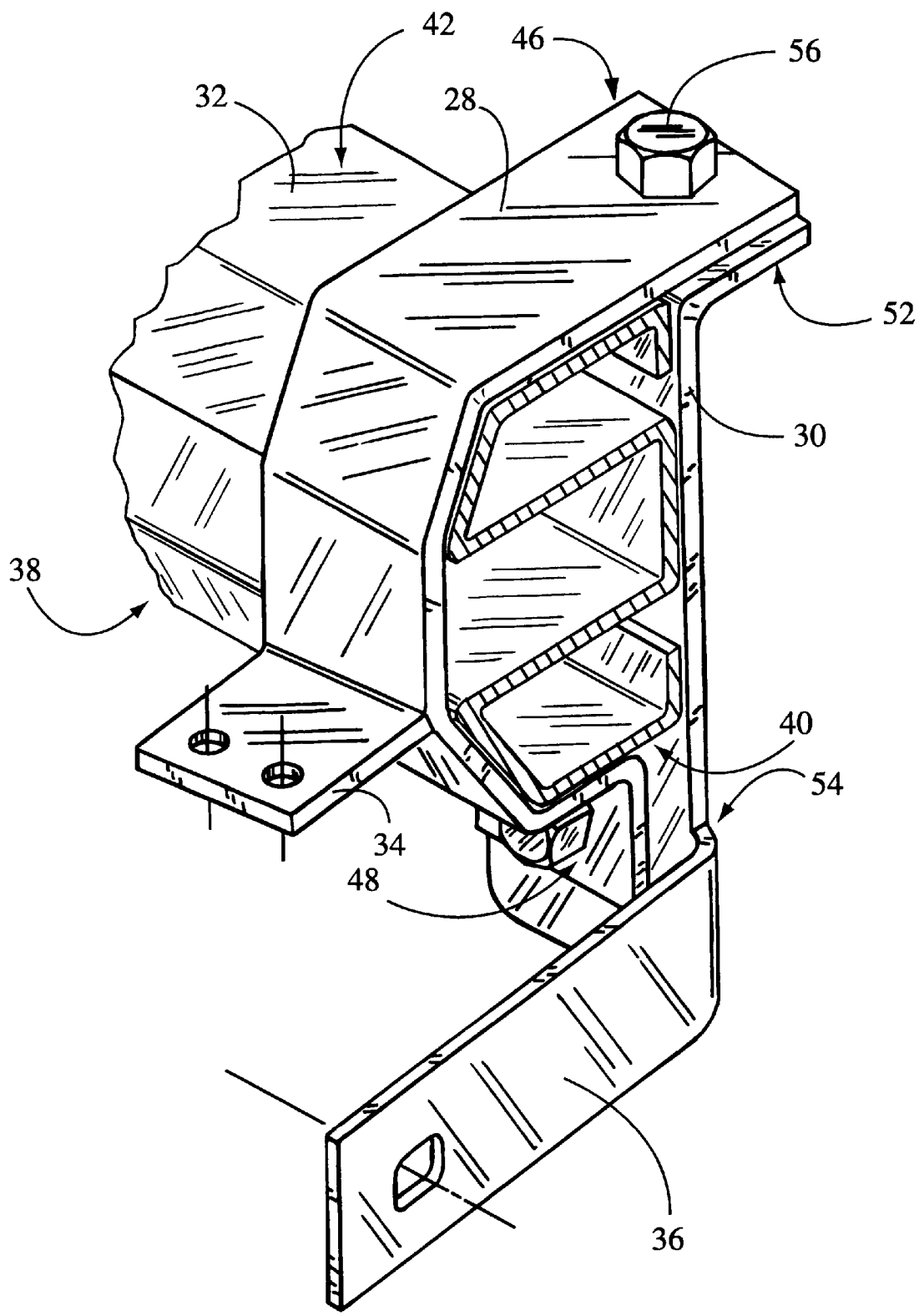
FIG. 5 is a partial cut-away view of a push bar mounting bracket.

As seen in FIG. 5, the front bracket 28 wraps around a front side 38, a bottom wall 40 and a top wall 42 of the inner bumper 32 in a generally C-shaped configuration. As such, the front bracket 28 is fabricated from a generally planar section of metallic material and is formed to be complementary to the exterior shape of the inner bumper 32. The top mounting tab 34 is a generally horizontal section of material attached to the front mounting bracket 28 such that the top mounting tab 34 projects outwardly from the front side 38 of the inner bumper 32 at a prescribed location. The top mounting tab 34 is formed with at least one mounting hole for attachment of the push bar member 18. The front bracket 28 additionally comprises a top attachment portion 46 that projects rearward from the top wall 42 of inner bumper 32, and a bottom attachment portion 48 that projects downwardly from the bottom wall 40 of inner bumper 32. Both the top and bottom attachment portions 46, 48 comprise mounting holes formed therein for mounting the front bracket 28 to the rear bracket 30.

The rear bracket 30 is formed from a generally planar section of metallic material such that it can abut a rear side 50 of the inner bumper 32. The rear bracket 30 comprises a top attachment portion 52 for mounting the rear bracket 30 to the top attachment portion 46 of the front bracket 28. The bottom mounting tab 36 of rear bracket 30 is generally vertical and formed such that it projects away from the front side 38 of the bumper 32 at a prescribed height below the bottom wall 40. The bottom mounting tab 36 is formed with at least one mounting hole drilled therein for attachment of the vertical push bar member 18. Furthermore, the rear bracket 30 is formed with a bottom attachment portion 54 for mounting the rear bracket 30 to the front bracket 28.

Figure 3:
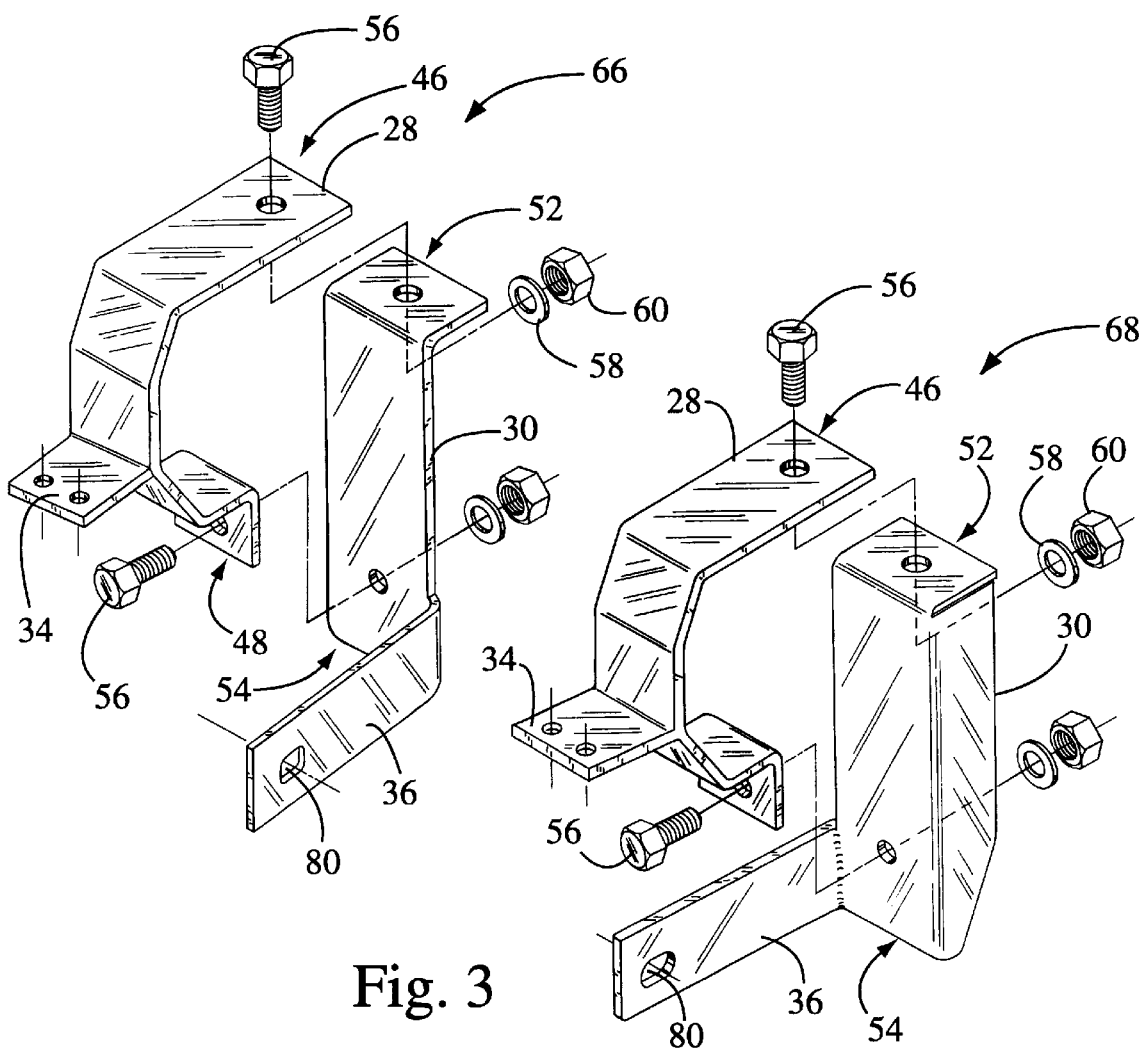
FIG. 3 is a perspective view of a set of push bar mounting brackets.

As best seen in FIG. 3, the front bracket 28 is attached to the rear bracket 30 through the use of threaded fasteners. As such the top attachment portion 46 of the front bracket 28 is attached through the use of a bolt 56, washer 58 and nut 60 to the corresponding top attachment portion 52 of the rear bracket 30. Similarly, the bottom attachment portion 48 of the front bracket 30 is attached to the corresponding bottom attachment portion 54 of the rear bracket 30. This attachment method allows the brackets 28, 30 to be rigidly attached to the inner bumper 32 at a prescribed location without having to remove nor drill such inner bumper 32. Therefore installation of the brackets 28, 30 can be easily accomplished.

Figure 4:
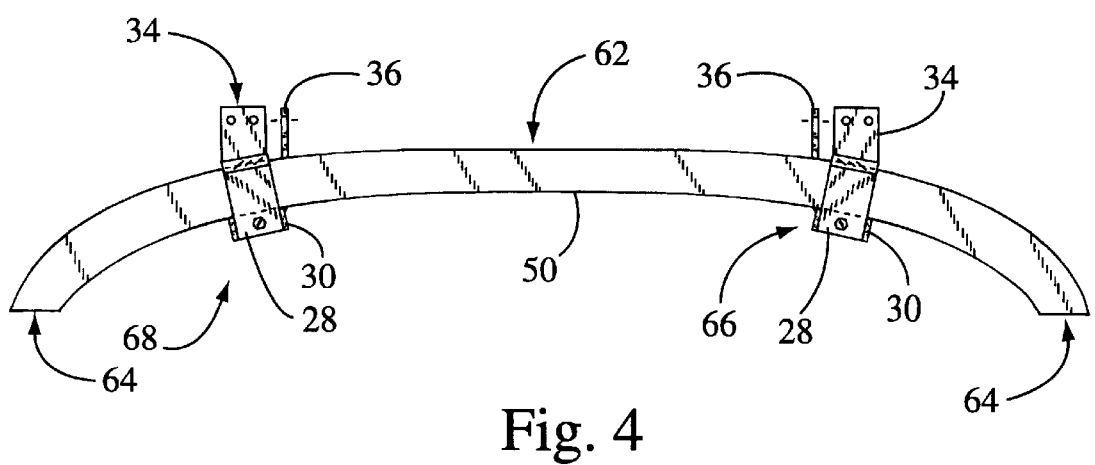
FIG. 4 is a top plan view of the push bar mounting brackets attached to an inner bumper.

The inner bumper 32 of the illustrated vehicle 14 is curved such that a front portion 62 projects forward of the the ends 64. As such, when a front bracket 28 and a rear bracket 30 are mounted thereon, the top mounting tab 34 and the bottom mounting tab 36 must be angled so that the push bar member 18 is parallel to the front of the vehicle 14. Therefore, as seen in FIG. 4, the top and bottom mounting tabs 34 and 36 are angled such that they are parallel to a longitudinal axis of the vehicle 14. As such, by angling the top and the bottom mounting tabs 34, 36, two bracket sets 66, 68 are created for corresponding sides of the vehicle. As seen in FIGS. 3 and 4, the passenger or right-hand-side bracket set 66 is created and a driver or left-hand-side bracket set 68 is created by angling the mounting tabs 36, 34 toward the center portion 62 of the inner bumper 32. The bottom mounting tab 36 of rear bracket 30 is attached to an edge of the rear bracket 30 closest to the center portion 62 of the inner bumper 32. However, as will be recognized by those skilled in the art, the bottom mounting tab 36 may be attached to any edge of the rear bracket 30 so long as the bottom mounting tab 36 projects forward from the inner bumper 32 at a prescribed location for mounting the vertical push bar member 18 as will be explained in greater detail below.

Figure 2:
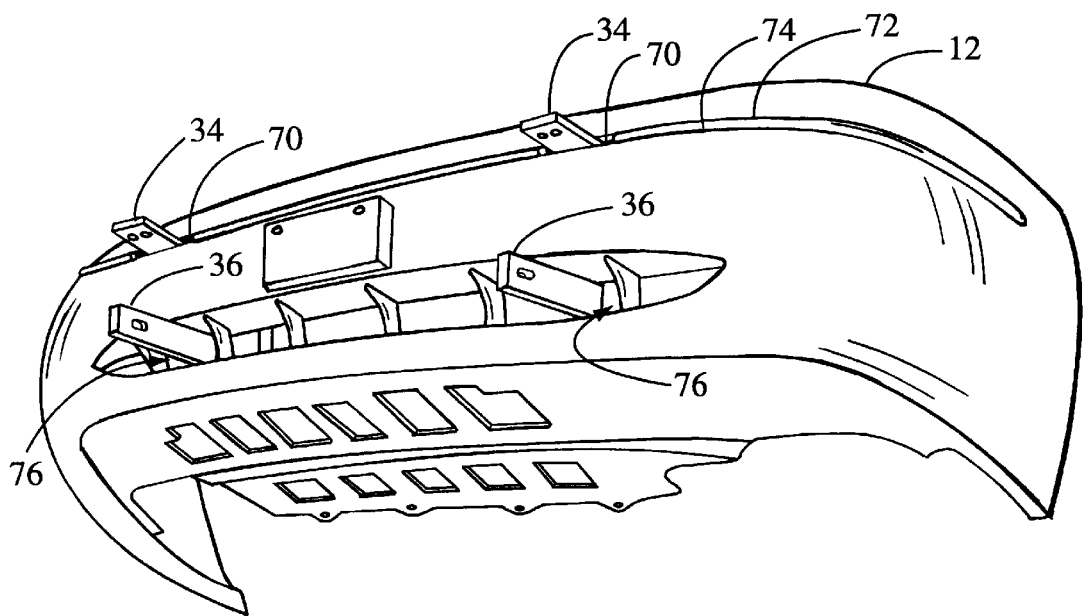
FIG. 2 is a perspective view of a bumper fascia with push bar mounting tabs projecting therethrough.

In order to mount the push bar assembly 10 to the vehicle 14 without substantial modification or damage thereto, the top and bottom mounting tabs 34, 36 are configured to exit the bumper fascia 12 through openings therein. Therefore as seen in FIG. 2, the bottom mounting tab 36 is configured to exit the bumper fascia at a prescribed location whereat a grille opening 76 is formed in the fascia 12. As such, the fascia 12 does not need to be modified for the bottom mounting tab 36. However, the bumper fascia 12 will need to be slightly modified to provide an opening for the top mounting tab 34. A small horizontal exit opening 70 is created in the fascia 12 in order for the top mounting tab 34 to project outwardly from the inner bumper 32 when the fascia 12 is placed thereover. As such the top mounting tab 34 is configured to exit the bumper fascia 12 at a location whereat the exit opening 70 is formed in a horizontal channel 72 for chrome trim 74 of the bumper fascia 12. Therefore, as seen in FIG. 2, a small section of the chrome trim 74 is removed, as well as an underlying section of the bumper fascia 12. Removal of these sections allows the top mounting tab 34 to project outwardly from the bumper fascia 12 through the exit opening 70 created thereby. With the top and bottom mounting tabs 34, 36 projecting outwardly from the bumper fascia 12, the vertical push bar member 18 may be installed thereon.

As seen in FIGS. 1 and 6, the vertical push bar member 18 is attached to the top and bottom mounting tabs 34, 36 via threaded fasteners. As such, vertical push bar member 18 comprises a horizontal, top mounting flange 78 that attaches to the horizontal top mounting tab 34. The top mounting flange 78 comprises mounting holes positioned in a location corresponding to the mounting holes in the top mounting tab 34. The vertical push bar member 18 also comprises a bottom mounting hole 80 corresponding to the mounting hole in the bottom mounting tab 36. Therefore, the vertical member 18 is mounted to the top and bottom mounting tabs 34, 36 at the top mounting flange 78 and the bottom mounting hole 80 with threaded fasteners. As will be recognized by those of ordinary skill in the art, the top and bottom mounting tabs 34, 36 may be configured to mount the vertical push bar member 18 in varying ways as long as the push bar member 18 comprises a corresponding attachment member.

The removal of a section of chrome trim 74 and bumper fascia 12 are the only permanent modifications made to the vehicle 14 during installation of the push bar member 18. As such, upon removal of the push bar member 18, and the front and rear brackets 28, 30 for resale of the vehicle 14, the bumper fascia 12 will not need to be replaced. Since the opening 70 is formed in the channel 72 for the chrome trim 74, the opening 70 can be covered by replacing the chrome trim 74. The bumper fascia 12 is not structurally integral for the performance of the inner bumper 32, such that the exit opening 70 can be covered with trim 74 without detriment to the safety of vehicle 14. Therefore, the only part that will need replacement upon removal of the push bar mounting system 10 and resale of the vehicle 14 is the chrome trim 74. The cost of replacing the chrome trim 74 is far less than replacing the inner bumper 32 and the bumper fascia 12 and therefore is more economical upon resale of the vehicle 14.

The push bar mounting system 10 is very simple to install in under twenty-five minutes. First the bumper fascia 12 is removed from the vehicle 14 by detaching the plastic push fasteners securing the fascia 12 to vehicle 14. Next, the front and rear mounting brackets 28, 30 are rigidly fastened to the inner bumper 32 using the threaded fastener 56, and corresponding washer 58 and nut 60. Both a right-hand-side 66 and a left-hand-side 68 set of brackets are installed on corresponding sides of the inner bumper 32. The front 28 and rear 30 brackets fit over the inner bumper 32 such that the bumper 32 does not need to be removed. The location where each of the top mounting tabs 34 exit the bumper fascia 12 is determined and the exit opening 70 is formed therein for each left and right hand set of brackets 66,68. The exit opening 70 is formed by first cutting away about three inches of the chrome trim 74 at the prescribed location with a utility knife and then cutting away the underlying fascia 12 in the trim channel 72. The exit opening 70 must be formed within the trim channel 72 so that the opening 70 is not noticeable when the trim 74 is replaced for resale of vehicle 14. The opening 70 must be formed on both the left-hand-side and the right-hand-side of bumper fascia 12 if two push bar mounting systems 10 are being used. The fascia 12 is then reinstalled on the vehicle 14 with the lower mounting tab 36 projecting through a grille opening 76 and the upper mounting tab 34 projecting through the exit opening 70 formed in the fascia 12. Next, the vertical push bar member 18 is installed to the top mounting tab 34 and the bottom mounting tab 36 for each set of mounting brackets 66,68.

Additional modifications and improvements of the present invention may also be apparent to those of ordinary skill in the art such as adapting the push bar mounting system 10 for use on other types of vehicles and with other types of accessories. Thus, the particular combination of parts described and illustrated herein is intended to represent only certain embodiments of the present invention, and is not intended to serve as limitations of alternative devices within the spirit and scope of the invention.

What is claimed is:

1. A push bar mounting system for a bumper of a vehicle, said bumper having a front exterior and a rear exterior, said system comprising:
    a first generally C-shaped front bracket formed complementary in shape to the front exterior and having a first mounting tab;
    a first generally planar rear bracket formed complementary in shape to the rear exterior and having a second mounting tab, the first rear bracket attached to the first front bracket such that the bumper is surrounded therebetween; and
    a first elongate push bar member attached to the first and the second mounting tabs, the first push bar member disposed generally vertically in front of the vehicle to prevent damage thereto.

2. The push bar mounting system of claim 1 wherein the first and second mounting tabs are configured to extend through a respective exit opening situated in a fascia associated with the bumper.

3. The push bar mounting system of claim 1 further comprising:
    a second generally C-shaped front bracket formed complementary in shape to the front exterior and having a third mounting tab;
    a second generally planar rear bracket formed complementary in shape to the rear exterior and having a fourth mounting tab, the second rear bracket attached to the second front bracket such that the bumper is surrounded therebetween; and
    a second elongate push bar member attached to the third and the fourth mounting tabs, the second push bar member disposed generally vertically in front of the vehicle.

4. The push bar mounting system of claim 3 further comprising a first generally horizontal grille guard member attached to the first and the second push bar members.

5. The push bar mounting system of claim 4 further comprising a second generally horizontal grille guard member attached to the first and the second push bar members.

6. The push bar mounting system of claim 5 wherein the first and second push bar members and the first and second horizontal grille guard members are configured to form a grille guard.

7. The push bar mounting system of claim 3 wherein the first, second, third and the fourth mounting tabs are configured to extend through a respective exit opening situated in a fascia associated with the bumper.

* * * * *